United States Patent
Hann et al.

(10) Patent No.: US 7,020,140 B1
(45) Date of Patent: *Mar. 28, 2006

(54) RECEIVE AND TRANSMIT BLOCKS FOR ASYNCHRONOUS TRANSFER MODE (ATM) CELL DELINEATION

(75) Inventors: William Patrick Hann, Round Rock, TX (US); Craig D. Botkin, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

This patent is subject to a terminal disclaimer.

(21) Appl. No.: 09/918,206

(22) Filed: Jul. 30, 2001

Related U.S. Application Data (63) Continuation of application No. 09/134,489, filed on Aug. 14, 1998, now Pat. No. 6,269,096.

(51) Int. Cl.
H04L 12/28 (2006.01)
(52) U.S. Cl. .................... 370/395.1; 370/474
(58) Field of Classification Search ............. 370/366, 370/474, 395, 365, 476, 536, 541, 542, 395.1, 370/471, 368.374, 428, 429
See application file for complete search history.

(56) References Cited

U.S. PATENT DOCUMENTS

| | | | |
|---|---|---|---|
| 4,771,425 A | 9/1988 | Baran et al. | 370/85 |
| 4,819,228 A | 4/1989 | Baran et al. | 370/85 |
| 4,903,261 A | 2/1990 | Baran et al. | 370/94.2 |
| 4,975,906 A | 12/1990 | Takiyasu et al. | 370/85.13 |
| 4,985,889 A | 1/1991 | Frankish et al. | 370/94.1 |
| 5,020,058 A | 5/1991 | Holden et al. | 370/109 |
| 5,059,925 A | 10/1991 | Weisbloom | 331/1 A |
| 5,072,449 A | 12/1991 | Enns et al. | 371/37.1 |
| 5,088,032 A | 2/1992 | Bosack | 395/200 |
| 5,115,431 A | 5/1992 | Williams et al. | 370/94.1 |
| 5,119,403 A | 6/1992 | Krishnan | 375/39 |
| 5,128,945 A | 7/1992 | Enns et al. | 371/37.1 |
| 5,224,099 A | 6/1993 | Corbalis et al. | 370/94.2 |
| 5,255,291 A | 10/1993 | Holden et al. | 375/111 |
| 5,274,631 A | 12/1993 | Bhardwaj | 370/60 |
| 5,274,635 A | 12/1993 | Rahman et al. | 370/60.1 |
| 5,274,643 A | 12/1993 | Fisk | 370/94.1 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,394,394 A | 2/1995 | Crowther et al. | 370/60 |

(Continued)

FOREIGN PATENT DOCUMENTS

EP 0677941 A2 10/1995

(Continued)

OTHER PUBLICATIONS

"Utopia Specification Level 1, Version 2.01," (af-phy-0017.000), *The ATM Forum Committee*, Mar. 21, 1994, 19 pages.

(Continued)

*Primary Examiner*—Brenda Pham
(74) *Attorney, Agent, or Firm*—Baker Botts L.L.P.

(57) ABSTRACT

Receive and transmit blocks for asynchronous transfer mode (ATM) cell delineation are disclosed. The receive block has a plurality of cell delineation blocks, a memory controller, a memory and a bus controller. The transmit block has a bus controller, a plurality of queue selection devices, a plurality of memory queues and a plurality of cell delineation blocks. According to one implementation, the bus controllers receive address mode/select signals and operate to respond to one of a plurality of subsets of port addresses on the ATM physical layer responsive to the address mode/select signals.

83 Claims, 3 Drawing Sheets

U.S. PATENT DOCUMENTS

| | | | |
|---|---|---|---|
| 5,422,880 A | 6/1995 | Heitkamp et al. | 370/60 |
| 5,430,715 A | 7/1995 | Corbalis et al. | 370/54 |
| 5,434,863 A | 7/1995 | Onishi et al. | 370/85.13 |
| 5,452,306 A | 9/1995 | Turudic et al. | 370/110.1 |
| 5,461,624 A | 10/1995 | Mazzola | 370/85.13 |
| 5,473,599 A | 12/1995 | Li et al. | 370/16 |
| 5,473,607 A | 12/1995 | Hausman et al. | 370/85.13 |
| 5,509,006 A | 4/1996 | Wilford et al. | 370/60 |
| 5,517,488 A | 5/1996 | Miyazaki et al. | 370/16 |
| 5,519,704 A | 5/1996 | Farinacci et al. | 370/85.13 |
| 5,555,244 A | 9/1996 | Gupta et al. | 370/60.1 |
| 5,561,663 A | 10/1996 | Klausmeier | 370/17 |
| 5,561,669 A | 10/1996 | Lenney et al. | 370/60.1 |
| 5,570,360 A | 10/1996 | Klausmeier et al. | 370/60 |
| 5,583,862 A | 12/1996 | Callon | 370/397 |
| 5,598,581 A | 1/1997 | Daines et al. | 395/872 |
| 5,604,741 A | 2/1997 | Samueli et al. | 370/402 |
| 5,612,957 A | 3/1997 | Gregerson et al. | 370/401 |
| 5,617,417 A | 4/1997 | Sathe et al. | 370/394 |
| 5,617,421 A | 4/1997 | Chin et al. | 370/402 |
| 5,666,353 A | 9/1997 | Klausmeier et al. | 370/230 |
| 5,673,265 A | 9/1997 | Gupta et al. | 370/432 |
| 5,691,997 A | 11/1997 | Lackey, Jr. | 371/53 |
| 5,729,546 A | 3/1998 | Gupta et al. | 370/434 |
| 5,732,079 A | 3/1998 | Castrigno | 370/362 |
| 5,737,526 A | 4/1998 | Periasamy et al. | 395/200.06 |
| 5,737,635 A | 4/1998 | Daines et al. | 395/872 |
| 5,740,171 A | 4/1998 | Mazzola et al. | 370/392 |
| 5,740,176 A | 4/1998 | Gupta et al. | 370/440 |
| 5,742,604 A | 4/1998 | Edsall et al. | 370/401 |
| 5,742,649 A | 4/1998 | Muntz et al. | 375/371 |
| 5,764,636 A | 6/1998 | Edsall | 370/401 |
| 5,764,641 A | 6/1998 | Lin | 370/412 |
| 5,765,032 A | 6/1998 | Valizadeh | 395/200.65 |
| 5,787,070 A | 7/1998 | Gupta et al. | 370/217 |
| 5,787,255 A | 7/1998 | Parlan et al. | 395/200.63 |
| 5,793,763 A | 8/1998 | Mayes et al. | 370/389 |
| 5,793,978 A | 8/1998 | Fowler | 395/200.56 |
| 5,796,732 A | 8/1998 | Mazzola et al. | 370/362 |
| 5,802,042 A | 9/1998 | Natarajan et al. | 370/255 |
| 5,805,595 A | 9/1998 | Sharper et al. | 370/442 |
| 5,812,618 A | 9/1998 | Muntz et al. | 375/372 |
| 5,822,383 A | 10/1998 | Muntz et al. | 375/362 |
| 5,835,036 A | 11/1998 | Takefman | 341/95 |
| 5,835,481 A | 11/1998 | Akyol et al. | 370/216 |
| 5,835,494 A | 11/1998 | Hughes et al. | 370/397 |
| 5,835,725 A | 11/1998 | Chiang et al. | 395/200.58 |
| 5,838,915 A | 11/1998 | Klausmeier et al. | 395/200.45 |
| 5,838,994 A | 11/1998 | Valizadeh | 395/876 |
| 5,859,550 A | 1/1999 | Brandt | 327/156 |
| 5,864,542 A | 1/1999 | Gupta et al. | 370/257 |
| 5,867,666 A | 2/1999 | Harvey | 395/200.68 |
| 6,269,096 B1 * | 7/2001 | Hann et al. | 370/366 |

FOREIGN PATENT DOCUMENTS

| | | |
|---|---|---|
| WO | WO 95/20282 | 7/1995 |
| WO | WO 96/04729 | 2/1996 |

OTHER PUBLICATIONS

Anthony Alles, "ATM Internetworking," *Cisco Systems, Inc.,* May 1995, 59 pages.

"Utopia Level 2, Version 1.0," (af-phy-0039.000), *The ATM Forum Committee,* Jun. 1995, 69 pages.

* cited by examiner

FIG. 2

RECEIVE AND TRANSMIT BLOCKS FOR ASYNCHRONOUS TRANSFER MODE (ATM) CELL DELINEATION

CROSS REFERENCE TO RELATED APPLICATIONS

This application is a continuation of U.S. application Ser. No. 09/134,489, filed Aug. 14, 1998, now U.S. Pat. No. 6,269,096, by William Patrick Hann and Craig D. Botkin and entitled "Receive and Transmit Blocks for Asynchronous Transfer Mode (ATM) Cell Delineation".

TECHNICAL FIELD OF THE INVENTION

This invention relates in general to asynchronous transfer mode (ATM) communication and, more particularly, to receive and transmit blocks for asynchronous transfer mode (ATM) cell delineation.

BACKGROUND OF THE INVENTION

Asynchronous transfer mode (ATM) communication systems are widely used for network communications. In general, ATM communication protocols involve stacks having several layers including a physical layer as the lowest layer. The ATM physical layer typically involves the movement of cells between source and target physical layer devices. The cells are often moved across a bus in smaller parallel sets of data. When the data reaches the target device, the cell is reconstructed and then sent up the stack to its final destination. One example of an ATM physical layer protocol is the Utopia 2 protocol. In implementing a physical layer bus, one problem that arises is cell delineation and the transfer of cells across the physical bus.

SUMMARY OF THE INVENTION

In accordance with the present invention, receive and transmit blocks for asynchronous transfer mode (ATM) cell delineation are disclosed that provide advantages over conventional cell delineation schemes.

According to one aspect of the present invention, a receive block for asynchronous transfer mode (ATM) cell delineation has a plurality of cell delineation blocks. Each cell delineation block is coupled to receive an associated serial bit stream, and each cell delineation block operates to identify ATM cell boundaries in the serial bit stream and to convert ATM cell payloads to parallel data words. The receive block also has a memory which has a plurality of memory blocks organized with each memory block associated with a cell delineation block. Each of the memory blocks has a plurality of ATM cell storage locations. A memory controller is coupled to the cell delineation blocks and the memory. The memory controller operates to read data words from the cell delineation blocks and to write data words to one of the cell storage locations in associated memory blocks. A bus controller is coupled to the memory controller and to the memory. The bus controller operates to interface with an ATM physical layer, to receive a memory status signal from the memory controller and to provide signals to the memory for communicating an ATM cell across the ATM physical layer. According to one implementation, the bus controller further receives address mode/select signals and operates to respond to one of a plurality of subsets of port addresses on the ATM physical layer responsive to the address mode/select signals.

According to another aspect of the present invention, a transmit block for asynchronous transfer mode (ATM) cell delineation has a bus controller that operates to interface with an ATM physical layer. The bus controller receives ATM cells across the ATM physical layer and converts ATM cell payloads to output parallel data words. The transmit block further has a plurality of queue memories that each have a plurality of cell storage locations. A plurality of queue select devices are coupled to the bus controller and receive the output parallel data words. Each queue select device provides the output parallel data words to one of the plurality of cell storage locations in an associated queue memory. A plurality of cell delineation blocks each receive parallel data words from an associated queue memory. Each cell delineation block operates to convert parallel data words to a serial bit stream carrying ATM cell payloads. According to one implementation, the bus controller further receives address mode/select signals and operates to respond to one of a plurality of subsets of port addresses on the ATM physical layer responsive to the address mode/select signals.

A technical advantage of the present invention is the use of a memory controller in the receive block which interfaces between cell delineation blocks and memory such that one block of memory can service all receive cell delineation blocks.

Another technical advantage is the use of a bus controller that can respond to different port addresses based upon input settings. This allows the same bus controller design to be used for different ports on the same physical layer bus. Further, the reduction in the number of ports reduces the load seen by the physical layer bus.

Other technical advantages should be readily apparent to one of ordinary skill in view of the description, drawings and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figures 1, 3, 4:
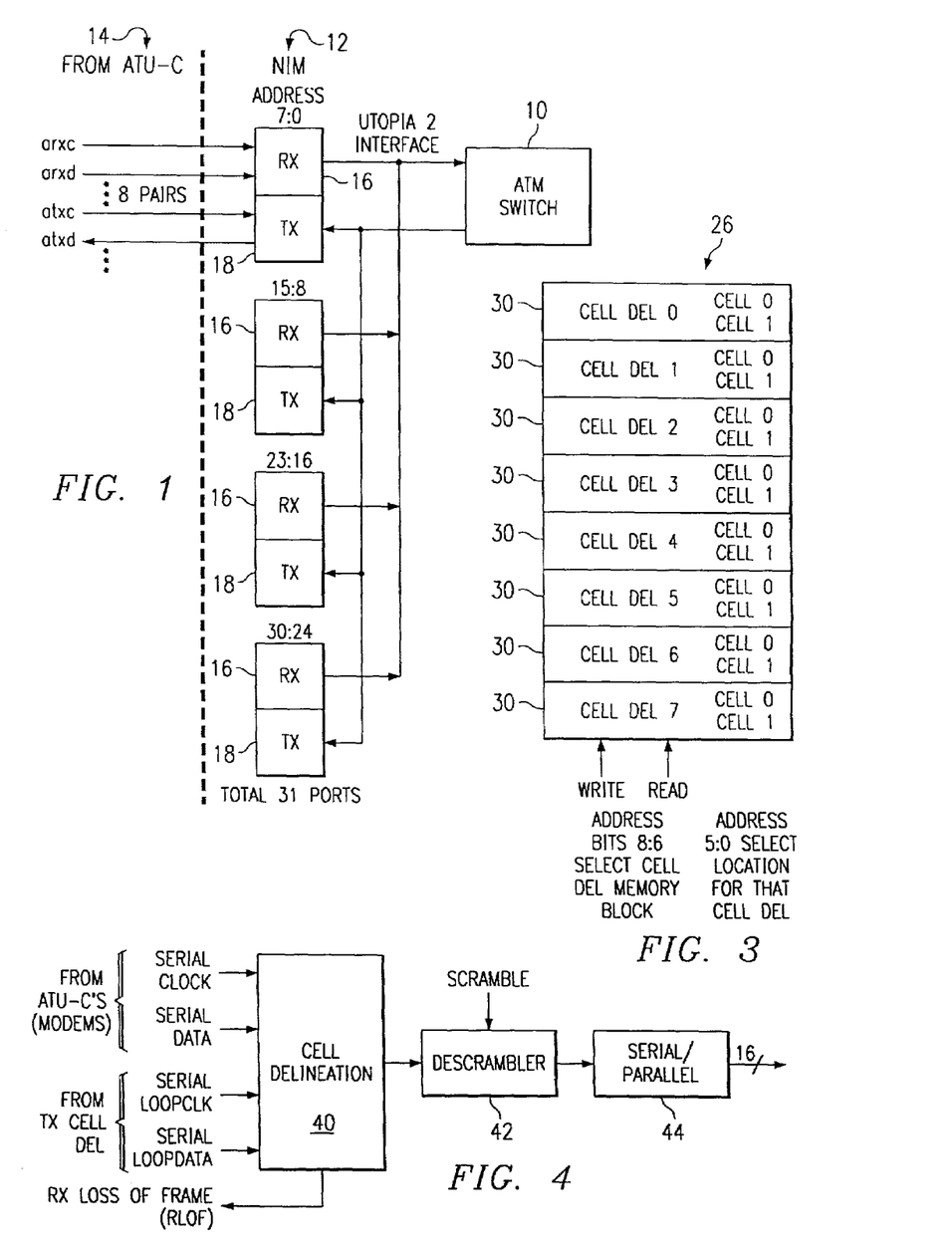
FIG. 1 is a block diagram of one embodiment of a portion of a network interface module in an XDSL communication system.
FIG. 3 is a block diagram of one embodiment of the organization of the memory in the receive block of FIG. 2.
FIG. 4 is a block diagram of one embodiment of a cell delineation block of FIG. 2.

FIG. 1 is a block diagram of one embodiment of a portion of a network interface module in an XDSL communication system. As shown, the system includes an asynchronous transfer mode (ATM) switch 10 that has a physical layer interface to cell delineation transceivers 12. ATM switch 10 and cell delineation transceivers 12 communicate ATM cells on the physical layer interface. In the illustrated embodiment, the physical layer interface is a Utopia 2 interface.

Cell delineation transceivers 12 are connected to a plurality of ADSL transceiver units 14 located at a central office (ATU-C). U.S. Pat. No. 5,668,857 provides an example of a communication system in which the system of FIG. 1 might be used. As shown, cell delineation transceivers 12 comprise a plurality of receive blocks 16 and transmit blocks 18. These blocks are organized in pairs of one receive block 16 and one transmit block 18, and each pair handles a specified set of port addresses on the ATM physical interface. For example, each pair of the receive blocks 16 and transmit blocks 18 handle a subset (e.g., eight addresses) of the 31 port addresses on the Utopia 2 interface.

In operation, a serial bit stream from an ADSL transceiver unit 141 is received by a receive block 16. Receive block 16 then delineates the serial bit stream into ATM cells which are then communicated across the physical interface to ATM switch 10. Conversely, ATM cells from ATM switch 10 are delineated and communicated across the physical interface to one of the transmit blocks 18. That transmit block 18 then converts the ATM cell into a serial bit stream which is provided to the appropriate ADSL transceiver unit 14.

Figure 2:
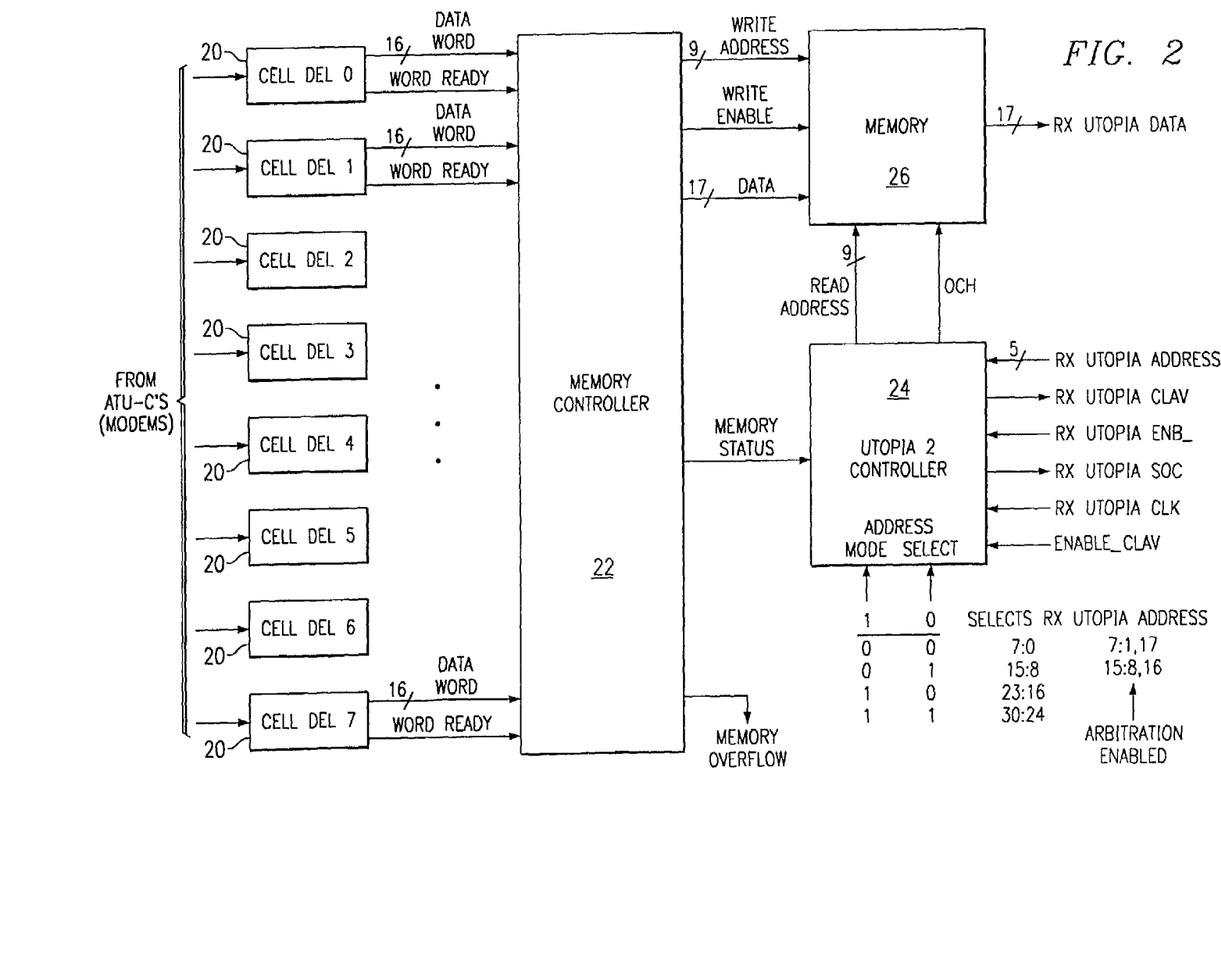
FIG. 2 is a block diagram of one embodiment of a receive block within the system of FIG. 1.

FIG. 2 is a block diagram of one embodiment of a receive block 16 within the system of FIG. 1. As shown, receive block 16 comprises a plurality of cell delineation blocks 20. Each cell delineation block 20 is connected to a memory controller 22 via a 16-bit data word line and provides a word-ready signal. Memory controller 22 is coupled to a bus controller 24 (e.g., Utopia 2 controller) and a memory 26. As shown, memory controller 22 provides a memory status signal to bus controller 24 and provides a write address and a write enable signal to memory 26 in addition to 17 bits of data (one bit of parity data). Bus controller 24 receives address mode/select signals which determine to which bus port addresses bus controller 24 responds. In general, an address on the physical layer interface, such as a Utopia 2 address, directly maps to one of the cell delineation channels. In one implementation, bus controller 24 responds to addresses as follows:

| mode select | | address | address (w/ arbitration) |
|---|---|---|---|
| 0 | 0 | 7:0 | 7:1, 17 |
| 0 | 1 | 15:8 | 15:9, 16 |
| 1 | 0 | 23:16 | n/a |
| 1 | 1 | 30:24 | n/a |

Further, bus controller 24 receives the physical interface signals (e.g., Utopia 2) as shown: receive address, cell available (clav), enable (enb_), start of cell (soc) and clock. Bus controller 24 also receives an enable_clav signal and an arbitration enabled signal. One arbitration scheme using these signals is disclosed in U.S. patent application Ser. No. 10/368,536, entitled "System and Method of Operation for Managing Data Communication Between Physical Layer Devices and ATM Layer Devices", the disclosure of which is incorporated herein by reference.

In operation, cell delineation blocks 20 receive serial bit streams from ADSL transceiver units 14. The cell delineation blocks 20 identify cell boundaries and separate cells carried by the bit streams and convert the cells to 16-bit parallel data words. As data words are ready, cell delineation blocks 20 provide word-ready signals to memory controller 22, along with the 16 bits of data. Memory controller 22 polls cell delineation blocks 20 in round-robin fashion. When a read-word signal is found, memory controller 22 reads the data words, and in turn provides a write address and write enable signal to memory 26 along with 17 bits of data (including an added parity bit). When an entire cell has been constructed in memory 26 for one of the cell delineation units 20, memory controller 22 provides a memory status signal to bus controller 24 indicating that a cell is ready to be transferred across the physical layer interface. In this case, bus controller 24 provides a read address on the address lines to memory 26 and signals memory 26 to enable output (oen). Memory 26 then causes the cell data to appear on the output data pins of memory 26. Bus controller 24 also signals the physical layer interface that a cell is available (Rx clav). In general, bus controller 24 responds with the cell available signal in response to seeing its address on the physical layer address lines. However, bus controller 24 does receive an "enable_clav" signal which prevents bus controller 24 from responding with a cell available until it is enabled to do so.

As shown and mentioned above, the address mode/select signals provided to bus controller 24 indicate to which port addresses bus controller 24 responds (7:0, 15:8, 23:16 or 30:24). Thus, using the address mode/select pins, bus controller 24 can be used to control receive block 16, for example, for responding to any of the thirty one ports of a Utopia 2 interface. Further, bus controller 24 has an arbitration mode which can be enabled. In this mode, bus controller 24 does not respond to ports 0 or 8 to allow other devices to respond to those addresses. Further, in this mode, the enable_clav signal can be used to prevent bus controller 24 from responding to an address on the physical interface.

Cell delineation blocks 20 are responsible for receiving serial data from the ADSL transceiver unit and searching for the beginning of ATM cells (cell delineation). When valid cells are being received, cell delineation blocks 20 pass the data words to one of the two receive buffers in memory 26 (see below). When a full cell has been received, that cell is passed across the receive portion of the physical layer (e.g., Utopia 2 bus).

Cell delineation is the process which allows identification of the cell boundaries. The ATM cell begins with a four byte header that is protected with a one byte HEC code that was generated with the polynomial $x^8+x^2+x+1$. The cell delineation algorithm generally follows a state machine with three states: HUNT, PRESYNC and SYNC. In the HUNT state, the delineation process is performed by checking bit by bit for the correct HEC for the assumed header field. This is accomplished in the cell delineation blocks 20, for example, with a forty bit shift register whose input is ARXD and is clocked by ARXC. At every bit time, the HEC is calculated across the last 32 bits of the shift register (4 bytes of header), x55 is added to the calculated HEC and compared to the bits in the first eight bits of the shift register. If a match is found then the cell delineation state machine goes into the PRESYNC state.

In the PRESYNC state, the cell delineation state machine waits a full cell time (424 clocks) to calculate the HEC across the last 32 bits of the input shift register and compare to the HEC field in the first byte of the shift register. If a match is not found, the state machine goes back into the HUNT state where on every clock the HEC is calculated. If a correct match is found an internal "correct HEC" counter is incremented. The PRESYNC state continues to search for correct HEC at every cell time. When six (DELTA value recommended by ITU-T I.432) cells pass through with correct HEC values, the cell delineation state machine goes into the SYNC state. At this time the RLOF output goes inactive low to indicate that the cell delineation state machine has correctly found the boundary of ATM cells.

In the SYNC state, at every cell time, the cell delineation state machine still checks for the correct HEC. If an incorrect HEC is found an internal "incorrect HEC" counter is incremented. If seven (ALPHA value recommended by ITU-T I.432) consecutive cells are found with the incorrect HEC, the cell delineation state machine reverts back to the HUNT state. The loss of cell delineation is indicated by the activation of the RLOF output. Cells with an incorrect HEC value and IDLE cells are dropped during the SYNC state. Cells with any HEC error are considered to have multiple bit errors. Therefore single bit error correction is not performed on cells who only have a single bit error in the HEC and that cell will be dropped. This operation corresponds to the ADSL Forum's ATM Mode Technical Group working text (WT-006-R7).

Starting in the PRESYNC state where a pseudo ATM cell boundary is determined, the payload data of the ATM cell will be sent through a self-synchronizing descrambling circuit (see FIG. 4) that will be responsible for descrambling the incoming scrambled payload bit stream. As soon as 43 bits of payload data are shifted in, the descrambling circuit will be in sync with the transmitting scrambler and the rest of the payload data bits will be descrambled properly. Only during the SYNC state are non-IDLE ATM cells with the correct HEC byte passed to the internal receive memories. During this state, the bit stream passes through a serial to parallel shift register and words of data are written to memory.

FIG. 3 is a block diagram of one embodiment of the organization of the memory 26 in a receive block 16 of FIG. 2. As shown, memory 26 is organized into a plurality of blocks 30 each dedicated to one of the cell delineation blocks 20. Each memory block 30 comprises segmented storage space for two cells (cell 0, cell 1) associated with that cell delineation block 20.

In operation, the address bits provided to memory 26 are used to select to which block 30 data is to be written. The selection is determined based upon the source cell delineation block and which cell (0 or 1) is next to be used. For example, address bits 8:6 can be used to select the memory block 30 (based upon the source cell delineation block) and address bits 5:0 can be used to select the location for that memory block 30. The two available cell storage spaces can be used in a ping-pong manner to essentially create a two deep queue for cell data written into a memory block 30 for a particular cell delineation block 20.

FIG. 4 is a block diagram of one embodiment of a cell delineation block 20 of FIG. 2. As shown, cell delineation block 20 comprises a cell delineation unit 40, a descrambling circuit 42 and a serial/parallel converter 44. Cell delineation unit 40 receives signals from an ADSL transceiver unit including a serial clock and serial data. Cell delineation unit 40 also receives a serial loop clock and a serial loop data from an associated transmit cell delineation unit. This loop can be used to test the physical interface without having to couple it with operating ATU-C's. Cell delineation unit 40 provides an output signal that indicates a loss of frame (RLOF) with respect to the serial bit stream from the ADSL transceiver unit.

Cell delineation unit 40 separates the serial bit stream into cells and provides an output of serial data to descrambling circuit 42. Descrambling circuit 42 then descrambles the data and provides a descrambled serial bit stream to serial/parallel converter 44. Serial/parallel converter 44 then converts the serial bit stream to a parallel data words being provided to the memory controller. As shown, a scramble signal is provided to descrambling circuit 42 in case the serial bit stream does not need to be descrambled.

Figures 5, 6:
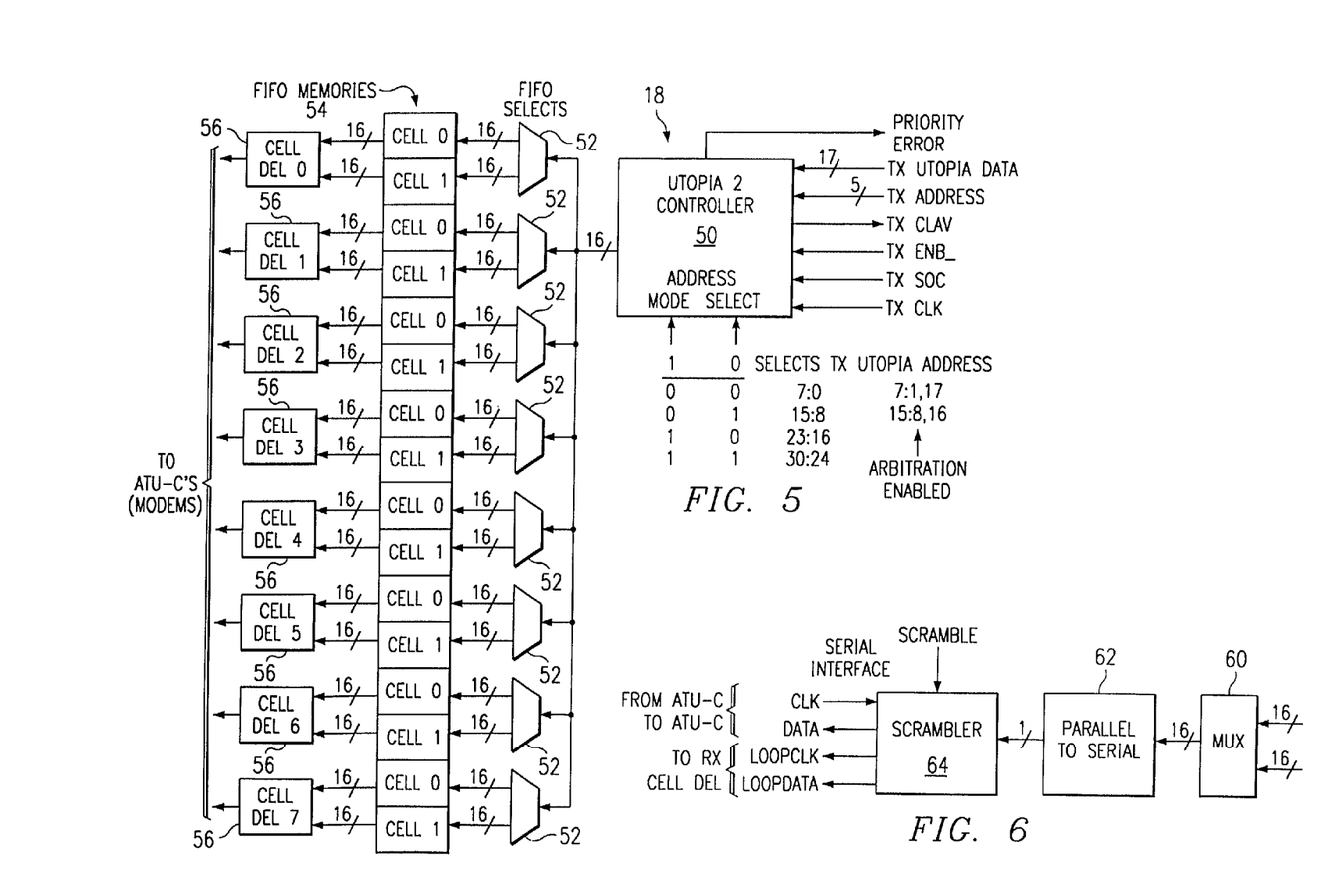
FIG. 5 is a block diagram of one embodiment of a transmit block within the system of FIG. 1.
FIG. 6 is a block diagram of one embodiment of a cell delineation block of FIG. 5.

FIG. 5 is a block diagram of one embodiment of a transmit block 18 within the system of FIG. 1. As shown, transmit block 18 comprises a bus controller 50. Bus controller 50 is connected to a plurality of queue select devices 52 (1:2 multiplexers) which select between a pair of queue memories 54 associated with each cell delineation block 56. Each cell delineation block 56 is, in turn, connected to an ADSL transceiver unit. Bus controller 50 receives physical layer interface signals including: data, address, enb_, soc and clock signals. Bus controller 50 provides a transmit clav signal to the physical interface. Further, analogous to the above discussion, bus controller 50 receives address mode/select signals that determine to which physical layer addresses bus controller 50 responds. In one implementation, bus controller 50 responds to addresses as follows:

| mode select | | address | address (w/ arbitration) |
|---|---|---|---|
| 1 | 0 | address | |
| 0 | 0 | 7:0 | 7:1, 17 |
| 0 | 1 | 15:8 | 15:9, 16 |
| 1 | 0 | 23:16 | n/a |
| 1 | 1 | 30:24 | n/a |

In operation, bus controller 50 receives ATM cell data from the physical layer. Bus controller 50 then provides data words to an appropriate queue select device 52 and queue memory 54 depending upon the target ADSL transceiver unit. Queue select device 52 allows a ping-pong selection between queue memories 54 for writing to one of the pair of cell storage spaces associated with the cell delineation block 56. For example, cell 0 is written first and then transferred to cell delineation block 56, and the next cell will be written into cell 1. The cell delineation blocks 56 convert the 16 bit parallel data words to a serial bit stream which is then provided to the ADSL transceiver units.

When one of the transmit queue memories 54 has been written with a full ATM cell, the status of that buffer memory will be transferred to an ADSL transmit state machine. This status bit is synchronized to the ATXC clock since the ADSL transmit state machine is running at a different rate than the transmit state machine. When the ADSL transmit state machine has finished transmitting an IDLE cell or a normal cell, and it detects that one of the buffer queue memories 54 has a new cell to send, then it will read the first byte out of that queue memory 64. The data will be loaded and will be shipped out the ATXD output on the rising edge of ATXC.

After the first five bytes (the cell header) have been read from the memory and serially sent out the ATXD output, the next 48 bytes (the cell payload) are serially sent out the ATXD output after passing through a data scrambling circuit. The scrambling circuit is enabled if a SCRAMBLE signal is set for the cell delineation block 56. Scrambling should be turned on during normal operation and is generally only turned off for diagnostic purposes. The scrambling circuit can be a self-synchronizing scrambler as described in the ITU-T I.432 specification using the polynomial $x^{43}+1$. The scrambler randomizes the bits from the payload field and is disabled when the five bytes of the ATM header are being transmitted. This randomization of data improves the performance and security of the cell delineation circuit that will be receiving the data. The scrambler is a 43 bit shift register whose input is driven by the exor of the payload data bit and the last bit of the shift register. ATXD can also be driven from the output of the exor.

When a cell has been completely transmitted, an ADSL transmit state machine sends a signal back to the transmit state machine to indicate that it has emptied one of the transmit buffer memories so that it can be used to store another cell. It also checks the status of the two transmit buffer queue memories 54. If neither of the queue memories 64 has a full cell to be transmitted, an IDLE cell will be sent. An IDLE cell is composed, for example, of the first through fifth bytes being x00, x00, x00, x01, and x52 with the payload being 48 identical bytes of value x6a.

FIG. 6 is a block diagram of one embodiment of a cell delineation block 56 of FIG. 5. As shown, cell delineation block 56 includes a multiplexer 60 which selects between one of the two 16 bit data word inputs from associate queue memories 54. Multiplexer 60 then provides the parallel data word to a parallel/serial converter 62. Parallel/serial converter 62 converts the data word to a serial bit stream which is provided to a scrambling circuit 64. Scrambling circuit 64 receives a clock signal from an associated ADSL transceiver unit and provides a serial bit stream to that ADSL transceiver unit. Scrambling circuit 64 also provides a loop clock and loop data to a receive cell delineation block for testing the physical layer without needing to install it in an operating system. In addition, scrambling circuit 64 receives a scramble signal that indicates whether scrambling needs to be done.

Although the present invention has been described in detail, it should be understood that various changes, substitutions and alterations can be made thereto without departing from the spirit and scope of the invention as defined by the appended claims.

What is claimed is:

1. A receive block for asynchronous transfer mode (ATM) communications, comprising:
    one or more cell delineation blocks each operable to receive an associated serial bit stream and each operable to identify ATM cell boundaries in the serial bit stream and convert one or more ATM cell payloads to parallel data;
    a memory comprising one or more memory blocks, each of the memory blocks associated with one or more of the cell delineation blocks, wherein each memory block comprises one or more ATM cell storage locations;
    a memory controller coupled to one or more of the cell delineation blocks and the memory, the memory controller operable to receive the parallel data from one or more of the cell delineation blocks and to communicate a portion of the parallel data to one or more of the cell storage locations in one or more of the memory blocks; and
    a bus controller coupled to the memory controller and to the memory, the bus controller operable to interface with an ATM physical layer and to provide one or more signals to the memory for communicating one or more ATM cells via the ATM physical layer.

2. The receive block of claim 1, wherein the bus controller is further operable to receive one or more address mode/select signals and to receive one or more subsets of port addresses via the ATM physical layer associated with the address mode/select signals.

3. The receive block of claim 2, wherein one or more of the subsets each comprise four subsets of port addresses.

4. The receive block of claim 1, wherein the cell delineation blocks comprise sixty-four cell delineation blocks.

5. The receive block of claim 4, wherein the memory blocks comprise sixty-four memory blocks each with two ATM cell storage locations.

6. The receive block of claim 1, wherein each cell delineation block comprises:
    a cell delineation unit operable to receive the serial bit stream, the cell delineation unit identifying ATM cell boundaries and providing an output serial bit stream of an ATM cell payload;
    a descrambler operable to receive the output serial bit stream of an ATM cell payload, the descrambler operable to descramble the bit stream; and
    a serial/parallel converter operable to receive the descrambled bit stream, the serial/parallel converter operable to convert the bit stream to parallel data.

7. The receive block of claim 1, wherein the ATM physical layer comprises a Utopia 2 interface.

8. The receive block of claim 1, further comprising an ATM switch operable to receive communication from the bus controller and to further direct the communication to a destination via an ATM link.

9. A transmit block for asynchronous transfer mode (ATM) cell delineation, comprising:
    a bus controller operable to interface with an ATM physical layer and to receive one or more ATM cells via the ATM physical layer;
    one or more queue memories each comprising one or more cell storage locations;
    one or more queue select devices each coupled to the bus controller and operable to receive output data from the bus controller, wherein the queue select devices are each operable to communicate the output data to each of the cell storage locations in an associated queue memory; and
    one or more cell delineation blocks operable to receive parallel data from a selected associated queue memory, one or more of the cell delineation blocks being operable to convert the parallel data to a serial bit stream that comprises one or more ATM cells.

10. The transmit block of claim 9, wherein the bus controller is further operable to receive one or more address mode/select signals and to receive one or more subsets of port addresses on the ATM physical layer associated with the address mode/select signals.

11. The transmit block of claim 10, wherein one or more of the subsets comprise four subsets of port addresses.

12. The transmit block of claim 9, wherein the cell delineation blocks comprise sixty-four cell delineation blocks.

13. The transmit block of claim 9, wherein the queue memories comprise sixty-four queue memories each having two associated cell storage locations.

14. The transmit block of claim 9, wherein each cell delineation block comprises:
    a multiplexer operable to receive parallel data from the ATM cell storage locations in the associated queue memory, the multiplexer selecting one parallel data segment and providing it as an output;
    a parallel/serial converter operable to receive the output from the multiplexer and to convert the parallel data segment to a serial bit stream; and
    a descrambler operable to receive the serial bit stream and to scramble the serial bit stream and to provide the scrambled bit stream as an output.

15. The transmit block of claim 9, wherein the ATM physical layer comprises a Utopia 2 interface.

16. The transmit block of claim 9, further comprising an ATM switch operable to receive communication from the bus controller and to direct the communication to a destination via an ATM link.

17. An apparatus, comprising:
  a bus controller operable to receive one or more asynchronous transfer mode (ATM) cells and from one or more memory blocks, wherein communication of the ATM cells from the bus controller is effected by a destination channel associated with an ATM signal that includes one or more of the ATM cells; and
  a memory controller operable to communicate with the bus controller and to receive one or more ATM data streams, each of the data streams being associated with one or more of the memory blocks, wherein the memory controller is further operable to detect the status of one or more of the ATM cells and communicate that status to the bus controller such that at least some of the ATM cells that are stored in one or more of the memory blocks are communicated from a memory via one or more ATM links wherein the memory controller receives one or more of the ATM cells from a selected one of sixty-four serial channels, and wherein each of the serial channels has an associated cell delineation block.

18. The apparatus of claim 17, wherein one or more of the ATM cells are demultiplexed by one or more serial channels before they are communicated to the memory controller.

19. The apparatus of claim 17, wherein the bus controller and the memory controller each include software comprising verilog hardware description language.

20. The apparatus of claim 17, wherein one or more of the ATM cells include a start of cell signal indicating a cell delineation protocol to be implemented.

21. The apparatus of claim 17, wherein one or more of the ATM cells are operable to receive flow control information, the flow control information indicating a stop in transfer for one or more of the ATM cells received by the memory controller.

22. The apparatus of claim 17, wherein one or more of the ATM cells each have a unique address that may be identified by the bus controller.

23. The apparatus of claim 17, further comprising an ATM switch operable to receive communication from the bus controller and to direct the communication to a destination via an ATM link.

24. An apparatus, comprising:
  a bus controller operable to receive one or more asynchronous transfer mode (ATM) data communication streams that include one or more ATM cells, the ATM communication streams being multiplexed and stored in one or more memory blocks, wherein the bus controller selects one or more of the ATM cells that are stored in one or more cell delineation blocks to be transferred to a destination based on data contained within one or more of the ATM cells, and wherein communication of one or more of the ATM cells is executed over a physical layer associated with the bus controller a memory controller operable to provide a status signal associated with one or more of the cell delineation blocks to the bus controller such that the bus controller generates a transmission signal to a memory, the transmission signal being received by the memory.

25. The apparatus of claim 24, wherein one or more of the ATM cells are demultiplexed by one or more serial channels before they are communicated to the bus controller.

26. The apparatus of claim 25, wherein the memory controller is coupled to the memory and the bus controller and is operable to receive one or more of the ATM cells from a selected one of sixty-four serial channels associated with the cell delineation blocks.

27. The apparatus of claim 26, wherein the bus controller and the memory controller each include software comprising verilog hardware description language.

28. The apparatus of claim 24, wherein one or more of the ATM cells include a start of cell signal indicating a cell delineation protocol to be implemented.

29. The apparatus of claim 24, wherein one or more of the ATM cells are operable to receive flow control information, the flow control information indicating a stop in transfer for one or more of the ATM cells received by the memory controller.

30. The apparatus of claim 24, wherein one or more of the ATM cells each have a unique address that may be identified by the bus controller.

31. The apparatus of claim 24, further comprising an ATM switch operable to receive communication from the bus controller and to direct the communication to a destination via an ATM link.

32. A method comprising:
  receiving a serial bit stream associated with one or more cell delineation blocks, wherein each of the cell delineation blocks is operable to identify ATM cell boundaries in the serial bit stream and convert one or more ATM cell payloads to parallel data;
  receiving the parallel data from one or more of the cell delineation blocks with a memory controller and communicating a portion of the parallel data to one or more cell storage locations included in one or more memory blocks that are associated with one or more of the cell delineation blocks, wherein the memory blocks are included in a memory;
  interfacing with an ATM physical layer using a bus controller; and
  providing one or more signals to the memory for communicating one or more ATM cells via the ATM physical layer.

33. The method of claim 32, further comprising demultiplexing one or more of the ATM cells with one or more serial channels before they are communicated to the memory controller.

34. The method of claim 32, further comprising receiving, by the bus controller, one or more address mode/select signals and one or more subsets of port addresses via the ATM physical layer associated with the address mode/select signals.

35. The method of claim 32, wherein the bus controller and the memory controller each include software comprising verilog hardware description language.

36. The method of claim 32, wherein one or more of the ATM cells include a start of cell signal indicating a cell delineation protocol to be implemented.

37. The method of claim 32, further comprising introducing flow control information to one or more of the ATM cells, the flow control information indicating a stop in transfer for one or more of the ATM cells received by the memory controller.

38. The method of claim 32, wherein one or more of the ATM cells each have a unique address that may be identified by the bus controller.

39. The method of claim 32, further comprising receiving, by an ATM switch, communication from the bus controller, wherein the ATM switch directs the communication to a destination via an ATM link.

40. The method of claim 32, wherein the cell delineation blocks comprise sixty-four cell delineation blocks.

41. The method of claim 32, further comprising:
receiving the serial bit stream with a cell delineation unit, the cell delineation unit identifying ATM cell boundaries and providing an output serial bit stream of an ATM cell payload;
receiving the output serial bit stream of an ATM cell payload with a descramble, the descrambler operable to descramble the bit stream; and
receiving the descrambled bit stream with a serial/parallel converter, the serial/parallel converter operable to convert the bit stream to parallel data.

42. The receive block of claim 32, wherein the ATM physical layer comprises a Utopia 2 interface.

43. A method, comprising:
interfacing, with an ATM physical layer using a bus controller and receiving one or more ATM cells via the ATM physical layer;
receiving output data from the bus controller with one or more queue select devices, each coupled to the bus controller, wherein the queue select devices are each operable to communicate the output data to one or more cell storage locations in an associated queue memory, each of the cell storage locations included in one or more queue memories; and
receiving parallel data from a selected associated queue memory with one or more cell delineation blocks, one or more of the cell delineation blocks being operable to convert the parallel data to a serial bit stream that comprises one or more ATM cells.

44. The method of claim 43, further comprising receiving, by the bus controller, one or more address mode/select signals and one or more subsets of port addresses on the ATM physical layer associated with the address mode/select signals.

45. The method of claim 43, wherein the cell delineation blocks comprise sixty-four cell delineation blocks.

46. The method of claim 43, wherein the queue memories comprise sixty-four queue memories each having two associated cell storage locations.

47. The method of claim 43, wherein each cell delineation block comprises:
a multiplexer operable to receive parallel data from the ATM cell storage locations in the associated queue memory, the multiplexer selecting one parallel data segment and providing it as an output;
a parallel/serial converter operable to receive the output from the multiplexer and to convert the parallel data segment to a serial bit stream; and
a descrambler operable to receive the serial bit stream and to scramble the serial bit stream and to provide the scrambled bit stream as an output.

48. The method of claim 43, wherein the ATM physical layer comprises a Utopia 2 interface.

49. The method of claim 43, further comprising receiving, by an ATM switch, communication from the bus controller, wherein the ATM switch directs the communication to a destination via an ATM link.

50. Software embodied in a computer readable media and operable to:
receive a serial bit stream associated with one or more cell delineation blocks, wherein each of the cell delineation blocks is operable to identify ATM cell boundaries in the serial bit stream and convert one or more ATM cell payloads to parallel data;
receive the parallel data from one or more of the cell delineation blocks with a memory controller and communicating a portion of the parallel data to one or more cell storage locations included in one or more memory blocks that are associated with one or more of the cell delineation blocks, wherein the memory blocks are included in a memory;
interface with an ATM physical layer using a bus controller; and
provide one or more signals to the memory for communicating one or more ATM cells via the ATM physical layer.

51. The software of claim 50, further operable to demultiplex one or more of the ATM cells with one or more serial channels before they are communicated to the memory controller.

52. The software of claim 50, further operable to receive one or more address mode/select signals and one or more subsets of port addresses via the ATM physical layer associated with the address mode/select signals.

53. The software of claim 50, wherein the bus controller and the memory controller each include software comprising verilog hardware description language.

54. The software of claim 50, wherein one or more of the ATM cells include a start of cell signal indicating a cell delineation protocol to be implemented.

55. The software of claim 50, further operable to introduce flow control information to one or more of the ATM cells, the flow control information indicating a stop in transfer for one or more of the ATM cells received by the memory controller.

56. The software of claim 50, wherein one or more of the ATM cells each have a unique address that may be identified by the bus controller.

57. The software of claim 50, further operable to receive, via an ATM switch, communication from the bus controller, wherein the ATM switch directs the communication to a destination via an ATM link.

58. The software of claim 50, wherein the cell delineation blocks comprise sixty-four cell delineation blocks.

59. The software of claim 50, further operable to:
receive the serial bit stream with a cell delineation unit, the cell delineation unit identifying ATM cell boundaries and provide an output serial bit stream of an ATM cell payload;
receive the output serial bit stream of an ATM cell payload with a descramble, the descrambler operable to descramble the bit stream; and
receive the descrambled bit stream with a serial/parallel converter, the serial/parallel converter operable to convert the bit stream to parallel data.

60. The software of claim 50, wherein the ATM physical layer comprises a Utopia 2 interface.

61. Software embodied in a compute readable media and operable to:
interface, with an ATM physical layer using a bus controller and receive one or more ATM cells via the ATM physical layer;
receive output data from the bus controller with one or more queue select devices, each coupled to the bus controller, wherein the queue select devices are each operable to communicate the output data to one or more cell storage locations in an associated queue memory, each of the cell storage locations included in one or more queue memories; and receive parallel data from a selected associated queue memory with one or more cell delineation blocks, one or more of the cell delineation blocks being operable to convert the parallel data to a serial bit stream that comprises one or more ATM cells.

62. The software of claim 61, further operable to receive, via the bus controller, one or more address mode/select signals and one or more subsets of port addresses on the ATM physical layer associated with the address mode/select signals.

63. The software of claim 61, wherein the cell delineation blocks comprise sixty-four cell delineation blocks.

64. The software of claim 61, wherein the queue memories comprise sixty-four queue memories each having two associated cell storage locations.

65. The software of claim 61, wherein the ATM physical layer comprises a Utopia 2 interface.

66. A system for asynchronous transfer mode (ATM) communications, comprising:
    means for receiving a serial bit stream associated with one or more cell delineation blocks, wherein each of the cell delineation blocks is operable to identify ATM cell boundaries in the serial bit stream and convert one or more ATM cell payloads to parallel data;
    means for receiving the parallel data from one or more of the cell delineation blocks with a memory controller and communicating a portion of the parallel data to one or more cell storage locations included in one or more memory blocks that are associated with one or more of the cell delineation blocks, wherein the memory blocks are included in a memory;
    means for interfacing with an ATM physical layer using a bus controller; and
    means for providing one or more signals to the memory for communicating one or more ATM cells via the ATM physical layer.

67. The system of claim 66, further comprising means for demultiplexing one or more of the ATM cells with one or more serial channels before they are communicated to the memory controller.

68. The system of claim 66, further comprising means for receiving, via the bus controller, one or more address mode/select signals and one or more subsets of port addresses via the ATM physical layer associated with the address mode/select signals.

69. The system of claim 66, wherein the bus controller and the memory controller each include software comprising verilog hardware description language.

70. The system of claim 66, wherein one or more of the ATM cells include a start of cell signal indicating a cell delineation protocol to be implemented.

71. The system of claim 66, further comprising means for introducing flow control information to one or more of the ATM cells, the flow control information indicating a stop in transfer for one or more of the ATM cells received by the memory controller.

72. The system of claim 66, wherein one or more of the ATM cells each have a unique address that may be identified by the bus controller.

73. The system of claim 66, further comprising means for receiving, via an ATM switch, communication from the bus controller, wherein the ATM switch directs the communication to a destination via an ATM link.

74. The system of claim 66, wherein the cell delineation blocks comprise sixty-four cell delineation blocks.

75. The system of claim 66, further comprising:
    means for receiving the serial bit stream with a cell delineation unit, the cell delineation unit identifying ATM cell boundaries and providing an output serial bit stream of an ATM cell payload;
    means for receiving the output serial bit stream of an ATM cell payload with a descramble, the descrambler operable to descramble the bit stream; and
    means for receiving the descrambled bit stream with a serial/parallel converter, the serial/parallel converter operable to convert the bit stream to parallel data.

76. The system of claim 66, wherein the ATM physical layer comprises a Utopia 2 interface.

77. A system for asynchronous transfer mode (ATM) communications, comprising:
    means for interfacing, with an ATM physical layer using a bus controller and receiving one or more ATM cells via the ATM physical layer;
    means for receiving output data from the bus controller with one or more queue select devices, each coupled to the bus controller, wherein the queue select devices are each operable to communicate the output data to one or more cell storage locations in an associated queue memory, each of the cell storage locations included in one or more queue memories; and
    means for receiving parallel data from a selected associated queue memory with one or more cell delineation blocks, one or more of the cell delineation blocks being operable to convert the parallel data to a serial bit stream that comprises one or more ATM cells.

78. The system of claim 77, further comprising means for receiving, by the bus controller, one or more address mode/select signals and one or more subsets of port addresses on the ATM physical layer associated with the address mode/select signals.

79. The system of claim 77, wherein the cell delineation blocks comprise sixty-four cell delineation blocks.

80. The system of claim 77, wherein the queue memories comprise sixty-four queue memories each having two associated cell storage locations.

81. The system of claim 77, wherein each cell delineation block comprises:
    a multiplexer operable to receive parallel data from the ATM cell storage locations in the associated queue memory, the multiplexer selecting one parallel data segment and providing it as an output;
    a parallel/serial converter operable to receive the output from the multiplexer and to convert the parallel data segment to a serial bit stream; and
    a descrambler operable to receive the serial bit stream and to scramble the serial bit stream and to provide the scrambled bit stream as an output.

82. The system of claim 77, wherein the ATM physical layer comprises a Utopia 2 interface.

83. The system of claim 77, further comprising means for receiving, by an ATM switch, communication from the bus controller, wherein the ATM switch directs the communication to a destination via an ATM link.

* * * * *